United States Patent [19]
Heckenkamp

[11] 3,966,239
[45] June 29, 1976

[54] RELEASE FOR BREAKAWAY COUPLING

[75] Inventor: Edward B. Heckenkamp, Brookfield, Wis.

[73] Assignee: Allis-Chalmers Corporation, Milwaukee, Wis.

[22] Filed: Dec. 16, 1974.

[21] Appl. No.: 533,320

[52] U.S. Cl. ............................ 285/316; 137/614.04
[51] Int. Cl.² ........................................ F16L 37/18
[58] Field of Search ........... 285/316, 315, 307, 304, 285/277, 1, 33; 137/614.04

[56] References Cited
UNITED STATES PATENTS

| | | | |
|---|---|---|---|
| 2,699,961 | 1/1955 | Omon et al. ........................... | 285/1 X |
| 3,417,781 | 12/1968 | Gregg ................................... | 137/614.04 |
| 3,435,848 | 4/1969 | Johnston ............................... | 137/614.04 |
| 3,537,478 | 11/1970 | Evans ..................................... | 285/1 X |
| 3,664,375 | 5/1972 | Marette ................................. | 137/614.04 |
| 3,779,586 | 12/1973 | Rossiter ................................. | 285/316 X |

FOREIGN PATENTS OR APPLICATIONS

| | | | |
|---|---|---|---|
| 1,110,964 | 8/1957 | Germany ............................... | 285/277 |

*Primary Examiner*—Werner H. Schroeder
*Assistant Examiner*—Wayne L. Shedd
*Attorney, Agent, or Firm*—Arthur L. Nelson

[57] ABSTRACT

An easy release mechanism for a breakaway hydraulic coupling. The release mechanism is mounted on a bracket with at least one coupling and includes a handle and a pivotal support for biasing the coupling to an engaging or disengaging position relative to the locking sleeve of the coupling.

10 Claims, 6 Drawing Figures

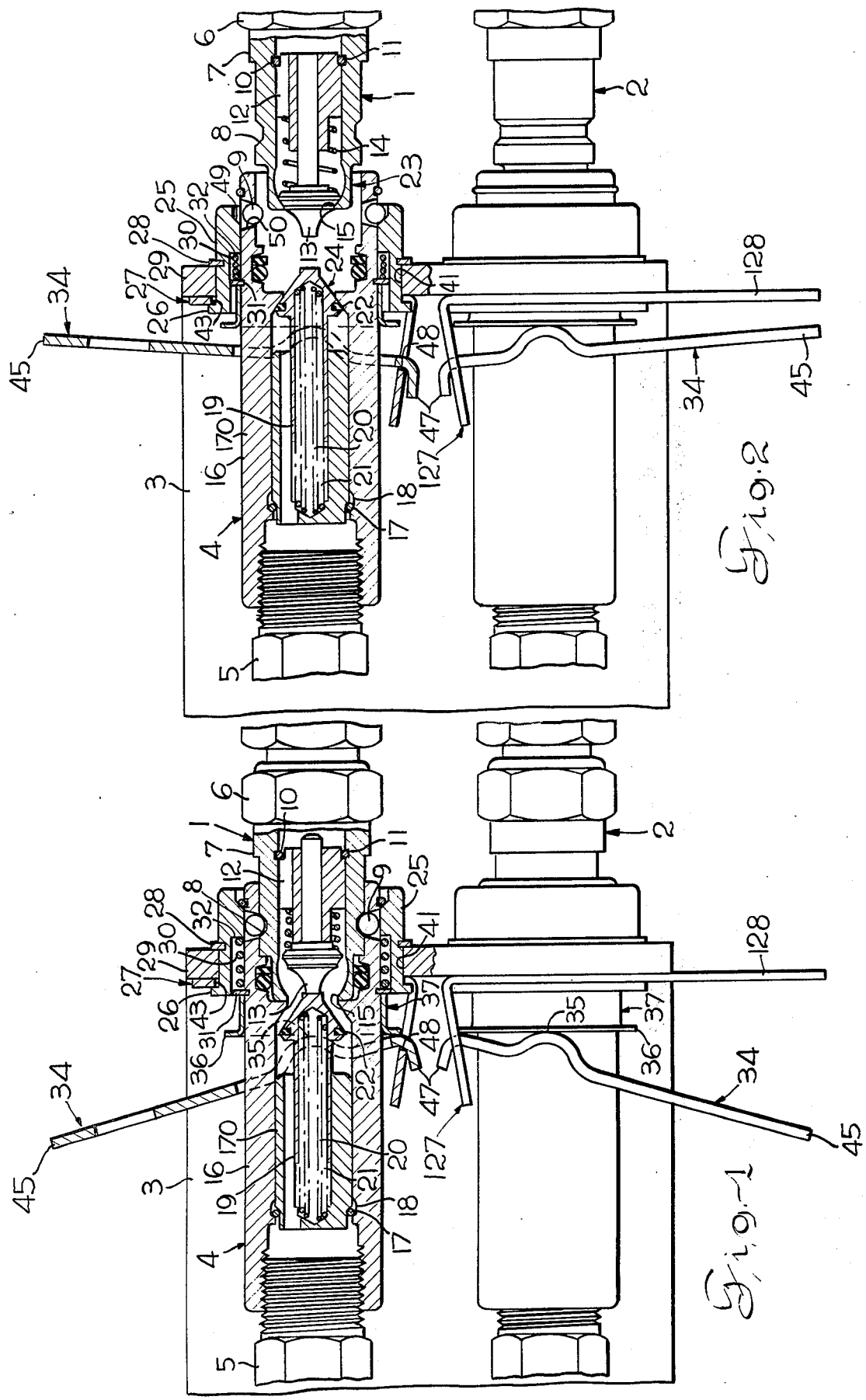

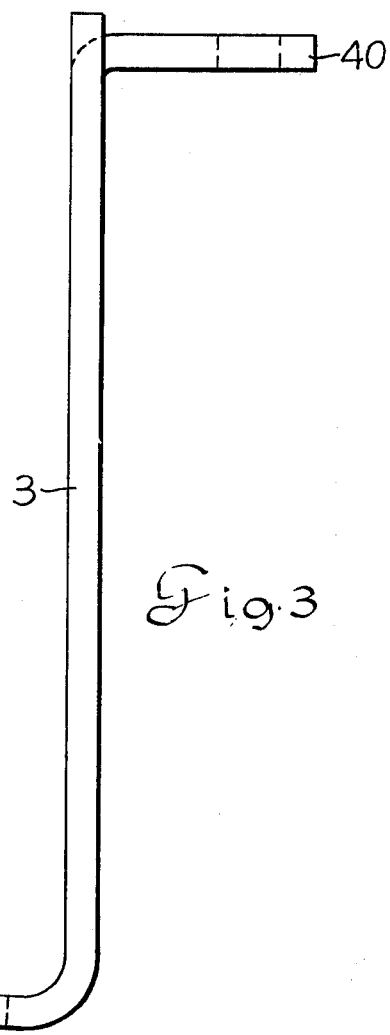
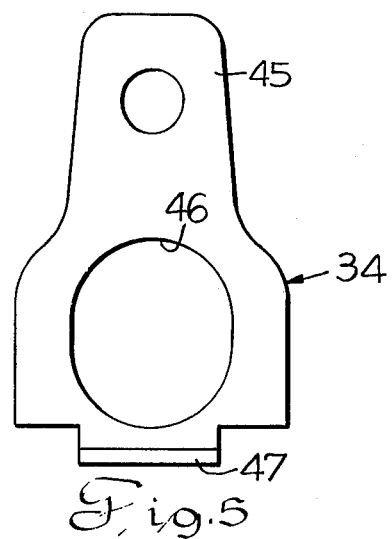
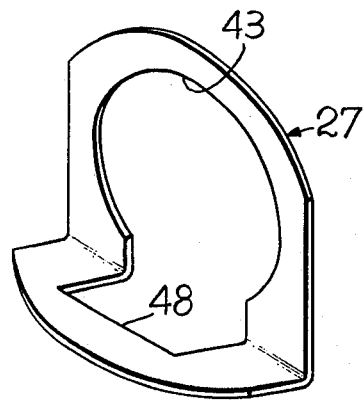
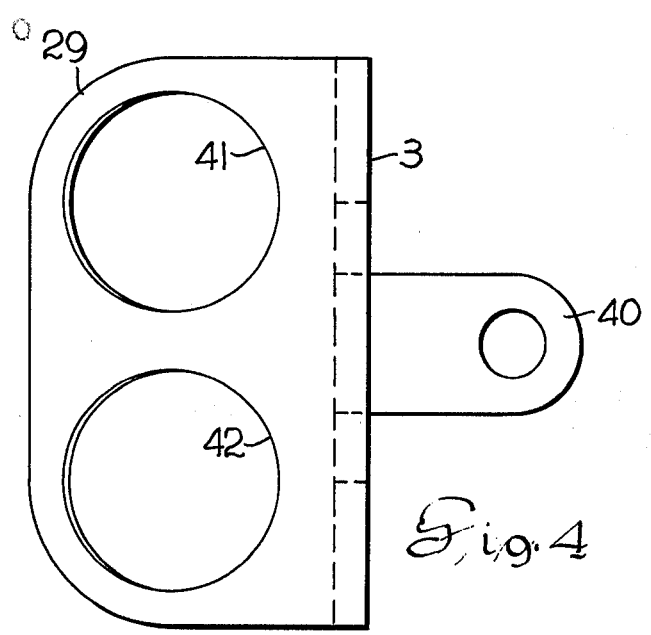

RELEASE FOR BREAKAWAY COUPLING

This invention relates to a hydraulic coupling in a hydraulic fluid line and more particularly to a release mechanism supported with the coupling on a bracket for ease in releasing or connecting the coupling.

It is conventional to operate tractors with hydraulic pumps for supplying pressurized fluid to hydraulically operated auxiliary equipment on the tractor as well as the implement. To operate hydraulic motors on the implement, it is necessary to provide a hydraulic line between the tractor and the implement. A coupling in the hydraulic line is required when the implement is disconnected from the tractor.

The hydraulic coupling used in this type of an arrangement is preferably of the breakaway type in the event that the implement is accidentally decoupled. Usually, the hydraulic lines carry extremely high pressure when in operation and to couple and decouple the lines is not always easily done particularly when the pressure is in the lines. Means to facilitate ease in coupling and decoupling of the hydraulic lines is desirable. Accordingly, this invention provides for a release mechanism for conveniently and easily coupling or decoupling of the hydraulic lines by the operator.

It is an object of this invention to provide a quick release mechanism for a hydraulic coupling.

It is another object of this invention to provide a quick release mechanism mounted on a bracket supporting the coupling and for biasing the coupling to a connecting or disconnecting position.

It is a further object of this invention to provide a coupling release mechanism including a hinge collar and a lever carried on a bracket with the coupling with the lever operating to release the coupling by the operator. The lever is mountable in a vertical or a horizontal position to facilitate operation of the lever and controlling of the coupling and decoupling.

The objects of this invention are accomplished by providing a bracket which is mounted on the vehicle. A coupling is mounted on the bracket with a hinge collar which extends along the side of the coupling. Positioned on the coupling is a spacer sleeve having a radial flange which slidably moves the housing of the socket section of the coupling against a biasing spring force which normally positions the locking sleeve in a locking position for locking the socket section to the plug section of the coupling. A lever is positioned on the hinge collar and extends around the coupling and radially from the coupling. The lever can be pivoted on its fulcrum to bias the spacer sleeve to position the coupling in a disengaging position. Accordingly, the plug section of the coupling may be either withdrawn from the coupling or can be inserted in the coupling while the lever is pivoted. The lever can be positioned in either vertical or horizontal position to facilitate operation during coupling and decoupling.

The preferred embodiment of this invention is illustrated in the attached drawings:

FIG. 1 illustrates a pair of couplings in a hydraulic line with one coupling in side elevation and the second coupling in a cross section view with the couplings in the coupled position;

FIG. 2 illustrates a pair of couplings in hydraulic lines with one of the couplings shown in side elevation view while the other coupling is in cross section and both couplings in the decoupled position;

FIG. 3 is a side elevation view of the bracket;

FIG. 4 is an end view of the bracket;

FIG. 5 is a side elevation view of the lever; and

FIG. 6 is a three-dimensional view of the hinge collar.

Referring to the drawings, the preferred embodiment of this invention is illustrated. FIG. 1 shows a pair of couplings 1 and 2 mounted on a bracket 3. Each of the couplings are identical. One of the couplings is in the supply line while the other coupling is in the return line.

FIG. 2 illustrates the same couplings 1 and 2, except the couplings in FIG. 2 are shown in the decoupled position while the couplings in FIG. 1 are in the coupled position.

A bracket 3 is mounted on a vehicle such as a tractor and extends rearwardly to support the couplings. The socket section 4 on the coupling is mounted on the bracket 3 and remains with the tractor. The plug section 1 is connected to the implement and remains on the implement, and is held in the socket section for supplying or returning fluid in the system.

Fitting 5 is connected to a hose on the tractor while the fitting 6 is connected to a hose or hydraulic line on the implement.

A casing 7 is formed with the locking annular recess 8 which receives the plurality of balls 9 when the coupling is coupled. The casing 7 receives locking ring 10 in the annular recess 11 which prevents the spider 12 from moving in the right-hand direction. The valve element 13 is spring biased in the left-hand direction to a closed position as shown in FIG. 2 by the spring 14 when the coupling is decoupled. The valve element 13 engages the valve seat 15 when the valve is in the closed position.

The socket section 4 includes the housing 16 fastened to the fitting 5. The housing 16 embraces the spring retainer 170 and receives a lock ring 17 within an annular recess 18. The valve element 19 reciprocates within the housing 16 and is biased to an extended position by the springs 20 and 21. The valve element 19 is provided with a seal 22.

The valve 23 in the plug section 1 is normally closed as shown in FIG. 2 when the coupling is decoupled. The valve 24 in the socket section is also normally closed when the coupling is decoupled as shown in FIG. 2. The socket section 4 is supported in the locking sleeve 25. Locking sleeve 25 is carried in the bracket 3. Locking sleeve has a radial flange 26 which engages the hinge collar 27. A snap ring 28 is positioned immediately adjacent the flange 29 of the bracket 3. This structure supports the couplings in its operating position.

The locking sleeve 25 is normally biased to the locking position as shown in FIG. 1 by the spring 30 which is compressively positioned between the snap ring 31 and a radial flange 32 on the locking sleeve 25.

The hinge collar 27 pivotally carries a lever 34. The lever 34 has a bearing surface 35 which normally engages a radial flange 36 of the spacer 37. The bracket 3 has a supporting flange 40 which is supported on the tractor. The flange 29 is formed with the holes 41 and 42 which receive the couplings 1 and 2.

The opening 43 in the hinge collar 27 receives a coupling and bears against the radial flange 29 in the assembled position. The lever 34 is formed with a handle 45. A hole 46 normally receives a coupling while the flange 47 engages the surface 48 on the hinge collar 27.

The operation of this device will be described in the following paragraph.

FIG. 1 shows the coupling in the coupled position. The lever 34 is biased so the handle is moved in the left-hand direction around the pivot point 48 of the hinge collar 27. With the handle 45 released, the locking collar 25 extends over the locking elements 9 as the socket section 4 moves in the left-hand direction within the locking collar. This movement is produced by the biasing force of the spring 30 between the snap ring 31 and the flange 32 on the locking sleeve 25. The plurality of balls 9 are seated in the annular locking recess 8 of the casing 7.

When it is desired to release the coupling the handle 45 of the lever 34 is moved in the right-hand direction as it pivots around the pivot surface 48. The bearing surface 35 engages the radial flange 36 and presses the spacer sleeve 37 underneath the locking sleeve 25 as it engages the snap ring 31. A substantial force on fitting 6 will produce the same result. When the socket section 4 is positioned as shown in FIG. 2, the ramp surface 49 on the locking sleeve 25 no longer engages the locking elements 9 and they are free to move radially in the openings 50. This permits the balls to withdraw from the locking recess 8 and release the coupling. The plug end 1 of the coupling can be removed from the socket section 4 of the coupling when the lever 34 is in this position.

Similarly, if the coupling is decoupled when the lever is moved to the position as shown in FIG. 2, the coupling can be connected by holding the lever in this position and inserting the socket section 1 in the socket of the socket section 4 and then releasing the lever until it moves to the position as shown in FIG. 1. In this manner, the coupling is connected.

A modification of the hinge collar 127 provides a handle 128 as shown in the lower portion of FIGS. 1 and 2. To decouple the coupling the handle 128 of hinge collar 127 is grasped simultaneously with handle 45 of lever 34 to press the spacer sleeve to decouple the coupling, with the provision of a handle 128 the coupling could be mounted on the fitting 5, however, the coupling would not automatically decouple when a heavy force is applied to fitting 6.

The embodiments of the invention in which an exclusive property or privilege is claimed are defined as follows:

1. A release mechanism on a hydraulic fluid coupling comprising, a socket section, a plug section for reception in said socket section, said plug section including casing means defining a locking recess, said socket section including a housing means defining radial openings, a spring seat on said housing, locking elements received in said openings, a locking sleeve embracing said housing means, spring means compressively positioned in said locking sleeve against said spring seat on said housing and normally biasing said locking sleeve for locking said locking elements in said locking recess of said casing means for locking said coupling together, a hinge collar defining an opening receiving said locking sleeve of said coupling and an axial flange forming a fulcrum, a bracket supporting said hinge collar and said coupling through said locking sleeve, a lever defining an opening receiving said coupling and pivotally supported on the fulcrum of said hinge collar, a spacer encircling said coupling and engaging said spring seat and said lever and biasing said socket section against said spring means to a disengaging position relative to said locking sleeve responsive to pivotal movement of said lever.

2. A release mechanism on a hydraulic fluid coupling as set forth in claim 1 wherein said spacer defines an axial flange encircling said socket section of said coupling, a radial flange adjoining said axial flange engaging said lever.

3. A release mechanism on a hydraulic fluid coupling as set forth in claim 1 wherein said lever defines a pivoting end surface engaging said fulcrum, a handle, an arcuate bearing surface intermediate said pivoting end surface and said handle for engaging said spacer.

4. A release mechanism on a hydraulic fluid coupling as set forth in claim 1 wherein the axial flange of said hinge collar defines a loop extending axially with said socket section of said coupling, a pivoting surface for engaging said lever for pivoting said lever and releasing said coupling.

5. A release mechanism on a hydraulic fluid coupling as set forth in claim 1 including supporting means on said bracket for supporting said coupling defining an opening for receiving said locking sleeve, said locking sleeve defining a radial flange for engaging said hinge collar, means defining a recess in said locking collar, a snap ring positioned in said recess of said collar to thereby position said hinge collar and said supporting means intermediate said radial flange and said snap ring on said locking sleeve for supporting said coupling.

6. A release mechanism for a hydraulic fluid coupling as set forth in claim 1 wherein said locking elements define balls for reception in said openings and said annular locking recess.

7. A release mechanism on a hydraulic fluid coupling as set forth in claim 1 wherein said bracket defines a radial wall having openings for reception of said coupling, said locking sleeve defining a radial flange for engaging said hinge collar, means locking said locking sleeve on said bracket for supporting said coupling.

8. A release mechanism on a hydraulic fluid coupling as set forth in claim 1 wherein said lever defines bearing means on opposing sides of said socket section of said coupling for engaging said spacer to thereby bias said socket section relative to said locking sleeve for release of said coupling.

9. A release mechanism on a hydraulic fluid coupling as set forth in claim 1 wherein said hinge collar defines a circular opening surrounding said locking sleeve, said lever defines a circular opening for receiving said socket section of said coupling to thereby permit rotation of said releasing mechanism about said coupling.

10. A release mechanism on a hydraulic fluid coupling as set forth in claim 1 wherein said housing means define an annular recess, said spring seat defines a snap ring positioned in said annular recess for engaging said spring means, said spring means compressively positioned between said snap ring and said locking sleeve, said spacer engaging said snap ring for biasing said socket section of said coupling against the force of said spring means responsive to movement of said lever for decoupling of said coupling.

* * * * *